(12) United States Patent
Liu et al.

(10) Patent No.: US 11,802,808 B2
(45) Date of Patent: Oct. 31, 2023

(54) AUTOMATIC TEST SYSTEM FOR ACTUAL STRESS OF A BRIDGE BASED ON DIC TECHNOLOGY

(71) Applicants: JSTI GROUP CO. LTD., Jiangsu (CN); NANJING TECH UNIVERSITY, Jiangsu (CN)

(72) Inventors: Duo Liu, Jiangsu (CN); Jiandong Zhang, Jiangsu (CN); Hui Xiong, Jiangsu (CN); Xiaonan Feng, Jiangsu (CN); Xianqiang Wang, Jiangsu (CN); Jun Lu, Jiangsu (CN)

(73) Assignees: JSTI GROUP CO. LTD, Jiangsu (CN); NANJING TECH UNIVERSITY, Jiangsu (CN)

( * ) Notice: Subject to any disclaimer, the term of this patent is extended or adjusted under 35 U.S.C. 154(b) by 0 days.

(21) Appl. No.: 17/763,218

(22) PCT Filed: Jun. 24, 2020

(86) PCT No.: PCT/CN2020/098256
§ 371 (c)(1),
(2) Date: Mar. 24, 2022

(87) PCT Pub. No.: WO2021/057136
PCT Pub. Date: Apr. 1, 2021

(65) Prior Publication Data
US 2022/0357235 A1    Nov. 10, 2022

(30) Foreign Application Priority Data
Sep. 24, 2019 (CN) .......................... 201910905518.2

(51) Int. Cl.
*G01M 5/00* (2006.01)

(52) U.S. Cl.
CPC .......... *G01M 5/005* (2013.01); *G01M 5/0008* (2013.01)

(58) Field of Classification Search
None
See application file for complete search history.

(56) References Cited

U.S. PATENT DOCUMENTS 10,845,187 B2 * 11/2020 Kontsos .............. G01M 5/0075

* cited by examiner

*Primary Examiner* — Raul J Rios Russo
*Assistant Examiner* — Carl F. R. Tchatchouang
(74) *Attorney, Agent, or Firm* — Yu Gang

(57) ABSTRACT

The present disclosure provides an automatic test system for actual stress of a bridge based on DIC technology, where the system includes a camera, a phosphor spraying device, a computer, and a sliding rail; the sliding rail is arranged on both sides of an upper wing of a box-shaped concrete beam; the phosphor spraying device is used to spray phosphor on a web of the box-shaped concrete beam to form speckles of varying light and shade; the camera is slidably connected to the sliding rail through a bracket, and is used to photograph the speckles and transmit a speckle image to the computer; and the computer is used to analyze and process the speckle image taken by the camera and generate a time history diagram of stress.

6 Claims, 3 Drawing Sheets

AUTOMATIC TEST SYSTEM FOR ACTUAL STRESS OF A BRIDGE BASED ON DIC TECHNOLOGY

CROSS-REFERENCE TO RELATED APPLICATION

The present disclosure takes the patent document filed on Sep. 24, 2019, with the application number of 201910905518.2 and titled "AUTOMATIC TEST SYSTEM FOR ACTUAL STRESS OF A BRIDGE BASED ON DIC TECHNOLOGY" as the priority document, which is incorporated herein by reference in its entirety.

TECHNICAL FIELD

The present disclosure relates to the field of bridge engineering detection technology, and specifically, to an automatic test system for actual stress of a bridge based on DIC technology.

BACKGROUND

With continuous expansion of public infrastructure in China, the quantity of new highway bridge construction projects has also increased. In addition, a large quantity of bridges in China have entered the maintenance period with the increase in service time. According to statistics from relevant departments, the current bridge with more than 25 years of service life in China has entered the aging period, and the proportion of bridges that have entered the aging period has exceeded 40% of the total quantity of bridges in China. Moreover, as time goes by, the quantity of bridges entering the aging period may gradually increase, and cannot continue to perform functions of the bridge. Therefore, the management and maintenance of bridges has gradually attracted people's attention. At this time, bridge detection technology is extremely important. The technical condition of the bridge may be assessed through detection technology, and the influence of some specific defects or damages on the quality and bearing capacity of the bridge is analyzed to provide data for reinforcement and maintenance of the bridge; furthermore, it is currently necessary to monitor the stress of the bridge under construction, analyze the technical condition in the bridge construction process, so as to provide a technical basis for the construction. Traditional bridge stress detection is risky, difficult, and inaccurate, and requires a lot of manpower.

SUMMARY

In view of this, the present disclosure proposes an automatic test system for actual stress of a bridge based on DIC technology, aiming to resolve the problem of inaccurate measurement of traditional bridge stress detection in the prior art.

The present disclosure proposes an automatic test system for actual stress of a bridge based on DIC technology, where the system includes a camera, a phosphor spraying device, a computer, and a sliding rail; the sliding rail is arranged on both sides of an upper wing of a box-shaped concrete beam; the phosphor spraying device is used to spray phosphor on a web of the box-shaped concrete beam to form speckles of varying light and shade; the camera is slidably connected to the sliding rail through a bracket, and is used to photograph the speckles and transmit a speckle image to the computer; and the computer is used to analyze and process the speckle image taken by the camera and generate a time history diagram of stress.

Optionally, the phosphor spraying device is arranged at an angle between the upper wing and the web of the box-shaped concrete beam.

Optionally, the phosphor spraying device includes a nozzle, a conduit, and phosphor; the conduit is provided with a cavity for placing the phosphor; and the nozzle is arranged on a wall of the conduit and communicates with the cavity of the conduit, and a plurality of nozzles are arranged along a length direction of the conduit.

Optionally, the plurality of nozzles are arranged equidistantly.

Optionally, the sliding rail is fixedly connected to both sides of the upper wing through expansion screws.

Optionally, the bracket includes a body, and a sliding portion which is arranged at both ends of the body and a fixed portion; the sliding portion is clamped in the sliding rail and is slidably connected to the sliding rail; the fixed portion is used to clamp the camera; and the body is bent such that the fixed portion is directly facing the web.

BRIEF DESCRIPTION OF THE DRAWINGS

The accompanying drawings which constitute a part of the present disclosure provide further comprehension of the present disclosure. The schematic embodiments of the present disclosure and description thereof are intended to explain the present disclosure and do not constitute an improper limitation to the present disclosure. In the drawings.

1. Box-shaped concrete beam; 11. Upper wing; 12. Web; 2. Camera; 3. Phosphor spraying device; 31. Nozzle; 32. Conduit; 33. Phosphor; 4. Computer; 5. Sliding rail; 6. Bracket; 61. Sliding portion; 62. Body; 63. Fixed portion; 7. Expansion screw.

DETAILED DESCRIPTION OF THE EMBODIMENTS

It should be noted that the following detailed descriptions are all illustrative, and are intended to provide further descriptions of the present disclosure. Unless otherwise specified, all technical terms and scientific terms used herein have the same meanings as commonly understood by those of ordinary skill in the art to which the present disclosure belongs.

It should be noted that the terms used herein are only for describing specific implementations, and are not intended to limit the example implementations according to the present disclosure. As used herein, unless the context specifies otherwise, the singular form is also intended to include the plural form. In addition, it should further be understood that when used in this specification, terms "comprising" and/or "including" indicate that there are features, steps, operations, devices, components, and/or combinations thereof.

It should be understood that when an element (such as a layer, a film, a region, or a substrate) is described as being "on" another element, the element may be directly on another element, or there may be an intermediate element. Moreover, in the specification and claims, when an element is described as "connected" to another element, the element may be "directly connected" to another element, or "connected" to another element through a third element.

Figure 1:
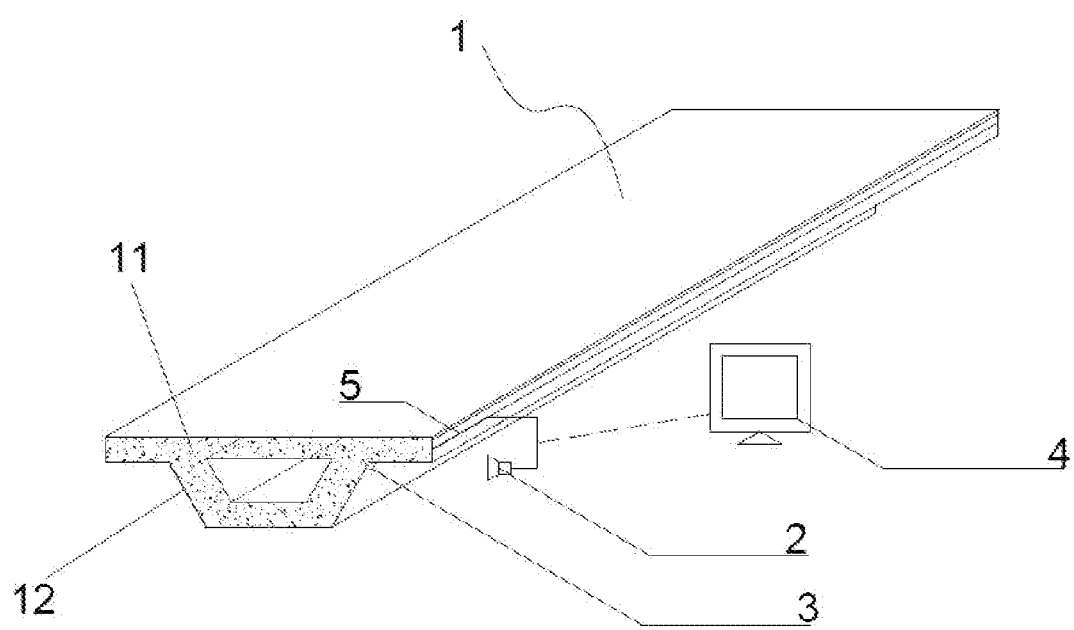
FIG. 1 is a schematic diagram of an entire structure of an automatic test system for actual stress of a bridge based on DIC technology according to an embodiment of the present disclosure.
Figure 2:
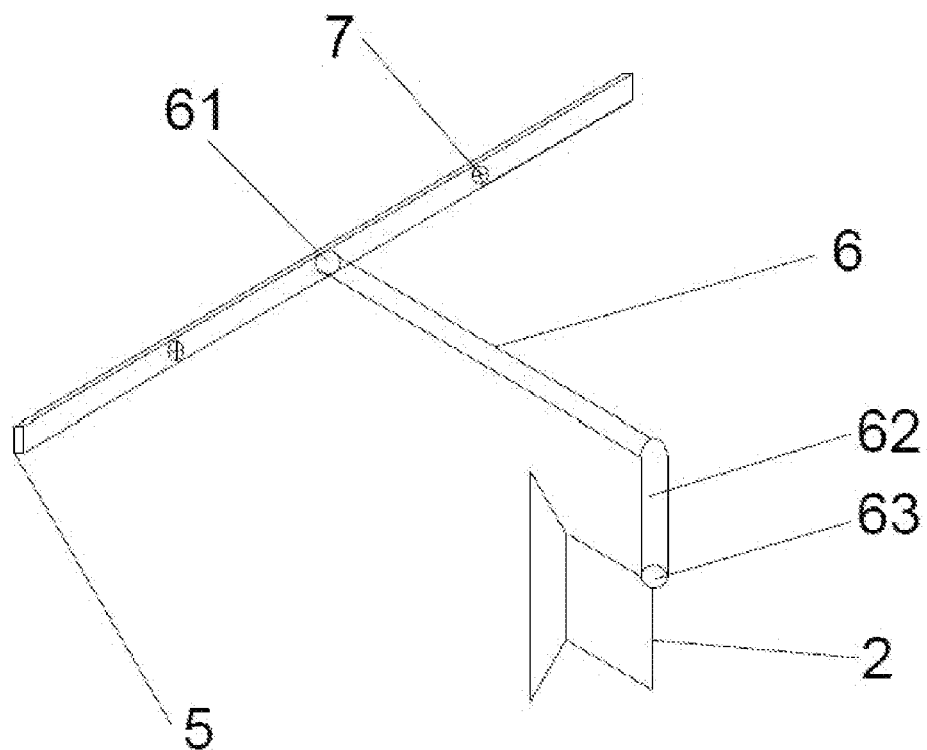
FIG. 2 is a schematic diagram for a position of a bracket according to an embodiment of the present disclosure; and The foregoing drawings include the following signs in the drawings.
Figure 3:
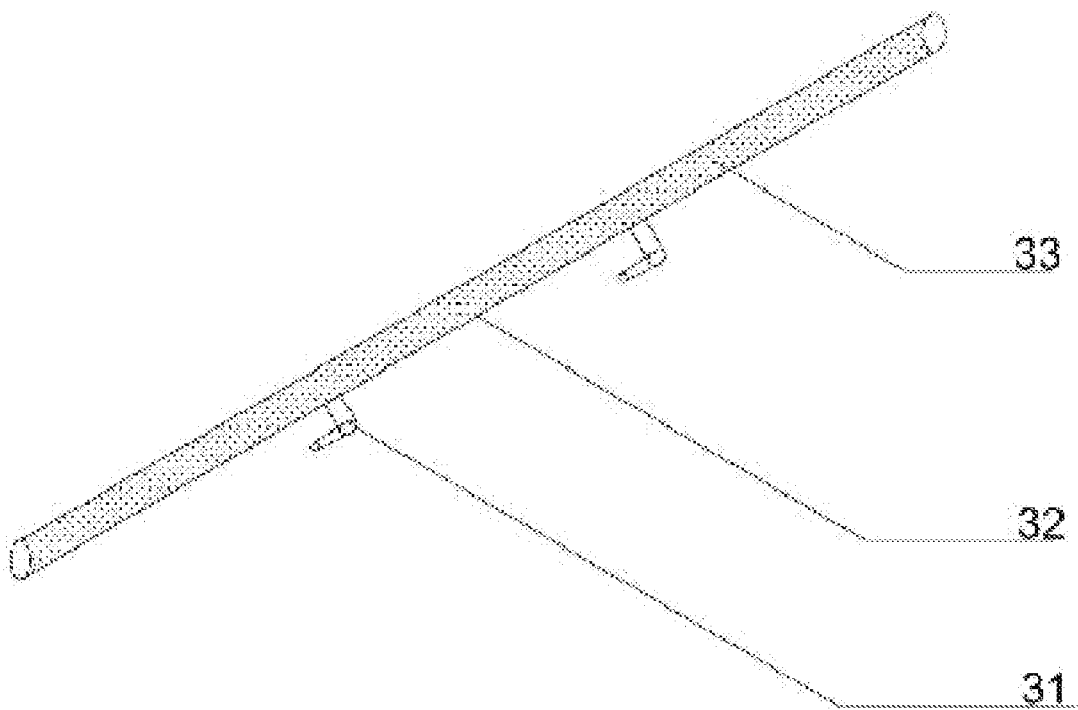

Refer to FIG. 1 to FIG. 2, as seen in the figure, the automatic test system for actual stress of a bridge based on DIC technology proposed in the present disclosure includes a camera 2, a phosphor spraying device 3, a computer 4, and a sliding rail 5, where the sliding rail 5 is arranged on both sides of an upper wing 11 of a box-shaped concrete beam 1, the phosphor spraying device 3 is used to spray phosphor on a web 12 of the box-shaped concrete beam 1 to form speckles of varying light and shade, the camera 2 is slidably connected to the sliding rail 5 through a bracket 6, and is used to photograph the speckles and transmit a speckle image to the computer 4, and the computer 4 is used to analyze and process the speckle image taken by the camera 2 and generate a time history diagram of stress.

Compared with the prior art, in the embodiments of the present disclosure, the DIC technology is applied to the stress test of the bridge web, and the DIC (Digital Image Correlation) technology is a high-tech formed in the measurement field in recent years. During measurement, the measured image is used as a measure or carrier to transmit and detect information for analysis and use. In this way, a signal that can be used can be found through analysis of the speckle image. This avoids high risk, high difficulty, and inaccuracy problems of the traditional detection, and has the advantages of high efficiency, high speed, and high accuracy of detection result, and also saves labor costs.

In this embodiment, the phosphor spraying device 3 is arranged at an angle between the upper wing 11 and the web 12 of the box-shaped concrete beam 1 to avoid wind, sun and rain. Specifically, the phosphor spraying device 3 includes a nozzle 31, a conduit 32, and phosphor 33, where the conduit 32 is provided with a cavity for placing the phosphor 33, the nozzle 31 is arranged on a wall of the conduit 32 and communicates with the cavity of the conduit 32, and a plurality of nozzles 31 are arranged along a length direction of the conduit 32. Preferably, in order to ensure that the nozzle may spray the phosphor 33 evenly, the plurality of nozzles 31 are arranged equidistantly. Specifically, one nozzle may be arranged every 2 m. The phosphor spraying device 3 may be connected to a pneumatic device, such that the phosphor 33 is sprayed out by air pressure.

In this embodiment, the sliding rail 5 is fixedly connected to both sides of the upper wing 11 through expansion screws 7.

In this embodiment, the bracket 6 includes a body 62, and a sliding portion 61 which is arranged at both ends of the body 62 and a fixed portion 63, where the sliding portion 61 is clamped in the sliding rail 5 and is slidably connected to the sliding rail 5, the fixed portion 63 is used to clamp the camera 2, and the body 62 is bent such that the fixed portion 63 is directly facing the web 12, and the shooting is clearer.

The automatic test system for actual stress of a bridge based on DIC technology proposed in the embodiments of the present invention may monitor the bridge technical condition of the bridge in an entire process from construction to operation, and may provide technical data for bridge construction, so as to ensure construction quality and safety. An area that cannot be detected by traditional method may also be detected.

Obviously, those skilled in the art may make various changes and modifications to the present disclosure without departing from the spirit and scope of the present disclosure. In this way, if these modifications and variations of the present disclosure fall within the scope of the claims of the present disclosure and equivalent technologies, the present disclosure also intends to include these modifications and variations.

It can be seen from the foregoing description that the foregoing embodiments of the present disclosure have the following technical effects:

The DIC technology is applied to the stress test of the bridge web, and the DIC (Digital Image Correlation) technology is a high-tech formed in the measurement field in recent years. During measurement, the measured image is used as a measure or carrier to transmit and detect information for analysis and use. In this way, a signal that can be used can be found through analysis of the speckle image. This avoids high risk, high difficulty, and inaccuracy problems of the traditional detection, and has the advantages of high efficiency, high speed, and high accuracy of detection result, and also saves labor costs.

The description above is only preferable embodiments of the present disclosure, and is not used to limit the present disclosure. For a person skilled in the art, the present disclosure may have various modifications and changes. Any modifications, equivalent substitutions, and improvements within the spirit and principles of the present disclosure are intended to be included within the scope of the present disclosure.

What is claimed is:

1. An automatic test system for actual stress of a bridge based on DIC technology, wherein the automatic test system comprises a camera (2), a phosphor spraying device (3), a computer (4), and a sliding rail (5);
    the sliding rail (5) is arranged on both sides of an upper wing (11) of a box-shaped concrete beam (1);
    the phosphor spraying device (3) is used to spray phosphor on a web (12) of the box-shaped concrete beam (1) to form speckles of varying light and shade;
    the camera (2) is slidably connected to the sliding rail (5) through a bracket (6), and is used to photograph the speckles and transmit a speckle image which is captured to the computer (4); and
    the computer (4) is used to analyze and process the speckle image taken by the camera (2) and generate a time history diagram of stress.

2. The automatic test system for the actual stress of the bridge based on the DIC technology according to claim 1, wherein the phosphor spraying device (3) is arranged at an angle between the upper wing (11) and the web (12) of the box-shaped concrete beam (1).

3. The automatic test system for the actual stress of the bridge based on the DIC technology according to claim 2, wherein the phosphor spraying device (3) comprises a nozzle (31), a conduit (32), and phosphor (33);
    the conduit (32) is provided with a cavity for placing the phosphor (33); and
    the nozzle (31) is arranged on a wall of the conduit (32) and the nozzle communicates with the cavity of the conduit (32), and a plurality of nozzles (31) are arranged along a length direction of the conduit (32).

4. The automatic test system for the actual stress of the bridge based on the DIC technology according to claim 3, wherein the plurality of nozzles (31) are arranged equidistantly.

5. The automatic test system for the actual stress of the bridge based on the DIC technology according to claim 1, wherein the sliding rail (5) is fixedly connected to the both sides of the upper wing (11) through expansion screws (7).

6. The automatic test system for the actual stress of the bridge based on the DIC technology according to claim 1, wherein the bracket (6) comprises a body (62), and a sliding portion (61) which is arranged at both ends of the body (62) and a fixed portion (63);
    the sliding portion (61) is clamped in the sliding rail (5) and is slidably connected to the sliding rail (5);
    the fixed portion (63) is used to clamp the camera (2); and
    the body (62) is bent such that the fixed portion (63) is directly facing the web (12).

* * * * *